US011293855B2

(12) United States Patent
Caplin et al.

(10) Patent No.: US 11,293,855 B2
(45) Date of Patent: Apr. 5, 2022

(54) CHEMICAL INDICATOR DEVICE WITH HEAT BLOCKS

(71) Applicant: XCR Diagnostics, Inc., Salt Lake City, UT (US)

(72) Inventors: Brian Caplin, Park City, UT (US); Nicole A. Fugere, Park City, UT (US)

(73) Assignee: XCR Diagnostics, Inc., Salt Lake City, UT (US)

(*) Notice: Subject to any disclaimer, the term of this patent is extended or adjusted under 35 U.S.C. 154(b) by 0 days.

(21) Appl. No.: 13/931,571

(22) Filed: Jun. 28, 2013

(65) Prior Publication Data

US 2014/0026685 A1    Jan. 30, 2014

Related U.S. Application Data

(60) Provisional application No. 61/665,584, filed on Jun. 28, 2012.

(51) Int. Cl.
| | | |
|---|---|---|
| *G01N 21/29* | (2006.01) | |
| *G01N 21/64* | (2006.01) | |
| *B01L 9/06* | (2006.01) | |
| B01L 7/00 | (2006.01) | |

(52) U.S. Cl.
CPC ............... *G01N 21/29* (2013.01); *B01L 9/06* (2013.01); *G01N 21/64* (2013.01); *B01L 7/00* (2013.01); *B01L 2200/026* (2013.01); *B01L 2300/0829* (2013.01); *G01N 2201/0221* (2013.01)

(58) Field of Classification Search
CPC ...... B01L 1/00; B01L 7/00; B01L 9/06; B01L 3/50851; B01L 7/52; B01L 7/54; B01L 2200/026; B01L 2300/0829; G01N 21/29; G01N 21/64; G01N 2201/0221
USPC ............... 73/864.91; 422/562, 82.08, 63, 67, 422/82.01; 436/55, 64, 171, 172
See application file for complete search history.

(56) References Cited

U.S. PATENT DOCUMENTS

| | | | | |
|---|---|---|---|---|
| 3,768,526 | A | * | 10/1973 | Sanz et al. ................... 141/130 |
| 5,333,675 | A | | 8/1994 | Mullis et al. |
| 5,670,120 | A | | 9/1997 | Degenhardt et al. |
| 5,958,349 | A | | 9/1999 | Petersen et al. |
| 6,153,426 | A | | 11/2000 | Heimberg |
| 6,238,869 | B1 | | 5/2001 | Kris et al. |
| 6,369,893 | B1 | | 4/2002 | Christel et al. |
| 6,372,486 | B1 | * | 4/2002 | Fripp ...................... B01L 7/52 |
| | | | | 165/206 |

(Continued)

FOREIGN PATENT DOCUMENTS

| | | |
|---|---|---|
| DE | 202008007512 U1 | 11/2010 |
| EP | 0953379 A1 | 11/1999 |

(Continued)

OTHER PUBLICATIONS

Birikh, R. V., "Thermocapilary Convection in a Horizontal Layer of Liquid", Zhurnal Prikladnoi Mekhaniki i Teckhnicheskoi Fiziki, No. 3, pp. 69-72, 1966.*

(Continued)

*Primary Examiner* — Nathaniel J Kolb
(74) *Attorney, Agent, or Firm* — Cooley LLP

(57) ABSTRACT

A chemical indicator device comprising a housing that comprises a viewing port, a means to provide illumination, and test tube wells so configured such that the observer views the test tubes from the side.

19 Claims, 6 Drawing Sheets

(56) References Cited

U.S. PATENT DOCUMENTS

| | | | |
|---|---|---|---|
| 6,403,037 B1 | 6/2002 | Chang et al. | |
| 6,565,815 B1 | 5/2003 | Chang et al. | |
| 6,660,228 B1 | 12/2003 | Chang et al. | |
| 6,818,185 B1 | 11/2004 | Petersen et al. | |
| 6,940,598 B2 | 9/2005 | Christel et al. | |
| 7,101,509 B2 | 9/2006 | Chang et al. | |
| 7,255,833 B2 | 8/2007 | Chang et al. | |
| 7,459,302 B2 | 12/2008 | Reid et al. | |
| 7,462,323 B1 | 12/2008 | Chang et al. | |
| 7,888,074 B2 | 2/2011 | Ehricht et al. | |
| 8,029,733 B2 | 10/2011 | Chang et al. | |
| 8,080,411 B2 | 12/2011 | Miao et al. | |
| 8,293,064 B2 | 10/2012 | Chang et al. | |
| 8,303,895 B2 | 11/2012 | Chang et al. | |
| 8,679,424 B2 * | 3/2014 | Koeda | B01L 3/5021 422/527 |
| 9,139,882 B2 | 9/2015 | Caplin | |
| 9,316,590 B2 | 4/2016 | Chang et al. | |
| 9,352,321 B2 | 5/2016 | Saito et al. | |
| 9,353,408 B2 | 5/2016 | Caplin | |
| 10,087,440 B2 | 10/2018 | Lofquist et al. | |
| 2002/0072112 A1 | 6/2002 | Atwood et al. | |
| 2003/0106682 A1 | 6/2003 | Reid et al. | |
| 2003/0152492 A1* | 8/2003 | Chang | F28F 21/04 422/417 |
| 2004/0086927 A1 | 5/2004 | Atwood et al. | |
| 2004/0122559 A1 | 6/2004 | Young et al. | |
| 2004/0214200 A1 | 10/2004 | Brown et al. | |
| 2004/0241048 A1 | 12/2004 | Shin et al. | |
| 2005/0028587 A1* | 2/2005 | Baer | B01L 3/5027 73/204.26 |
| 2005/0112023 A1 | 5/2005 | Liang | |
| 2006/0120566 A1 | 6/2006 | Myogadani et al. | |
| 2006/0194207 A1 | 8/2006 | Mitani et al. | |
| 2007/0254372 A1 | 11/2007 | Bickel et al. | |
| 2008/0003564 A1 | 1/2008 | Chen et al. | |
| 2008/0153096 A1 | 6/2008 | Witty et al. | |
| 2008/0274511 A1 | 11/2008 | Tan et al. | |
| 2008/0280350 A1* | 11/2008 | Moriwaki | G01N 21/6428 435/286.1 |
| 2009/0061450 A1 | 3/2009 | Hunter | |
| 2009/0130745 A1 | 5/2009 | Williams et al. | |
| 2009/0169190 A1* | 7/2009 | Fang | B41J 2/14056 392/485 |
| 2010/0112683 A2 | 5/2010 | Atwood et al. | |
| 2010/0173394 A1 | 7/2010 | Colston, Jr. et al. | |
| 2010/0273245 A1 | 10/2010 | Tajima | |
| 2010/0279299 A1 | 11/2010 | Maltezos et al. | |
| 2010/0297754 A1 | 11/2010 | Solli et al. | |
| 2011/0033899 A1* | 2/2011 | Chemeris | B01L 7/525 435/91.2 |
| 2011/0039305 A1 | 2/2011 | Termaat et al. | |
| 2011/0097763 A1 | 4/2011 | Pollack et al. | |
| 2011/0176971 A1 | 7/2011 | Chang et al. | |
| 2011/0212516 A1 | 9/2011 | Ness et al. | |
| 2012/0028342 A1 | 2/2012 | Ismagilov et al. | |
| 2012/0115214 A1* | 5/2012 | Battrell | G01N 21/6456 435/287.2 |
| 2012/0145260 A1 | 6/2012 | Koeda | |
| 2012/0240597 A1 | 9/2012 | Hong et al. | |
| 2012/0270309 A1 | 10/2012 | Arai et al. | |
| 2012/0271127 A1 | 10/2012 | Battrell et al. | |
| 2013/0072429 A1 | 3/2013 | Ashkenazi et al. | |
| 2014/0073013 A1 | 3/2014 | Gorman et al. | |
| 2015/0105300 A1 | 4/2015 | Chen et al. | |
| 2015/0301033 A1 | 10/2015 | Guo et al. | |
| 2018/0264476 A1 | 9/2018 | Caplin et al. | |

FOREIGN PATENT DOCUMENTS

| | | |
|---|---|---|
| EP | 2157187 A2 | 2/2010 |
| EP | 2465608 A2 | 6/2012 |
| JP | S62-178352 U | 11/1987 |
| JP | 2000-051684 A | 2/2000 |
| JP | 2003-344290 A | 12/2003 |
| JP | 2011-232320 A | 11/2011 |
| JP | 2012-060912 A | 3/2012 |
| JP | 2012-115208 A | 6/2012 |
| KR | 2003-0024592 A | 3/2003 |
| WO | WO 1998/043740 A2 | 10/1998 |
| WO | WO 2068932 A2 * | 9/2002 |
| WO | WO 2003/025226 A1 | 3/2003 |
| WO | WO 2004/095009 A1 | 11/2004 |
| WO | WO 2009/072987 A1 | 6/2009 |
| WO | WO 2010/110096 A1 | 9/2010 |
| WO | WO 2010/118541 A1 | 10/2010 |
| WO | WO 2011/021640 A1 | 2/2011 |
| WO | WO 2012012779 A2 * | 1/2012 |
| WO | WO 2012/073484 A1 | 6/2012 |
| WO | WO 2014/005112 A1 | 1/2014 |
| WO | WO 2015/068038 A2 | 5/2015 |
| WO | WO 2015/073999 A1 | 5/2015 |
| WO | WO2016007914 A1 | 1/2016 |
| WO | WO 2017/049230 A1 | 3/2017 |
| WO | WO 2017/123622 A1 | 7/2017 |

OTHER PUBLICATIONS

International Search Report for International Application No. PCT/US2013/048750, dated Nov. 22, 2013, 2 pages.

Written Opinion of the International Searching Authority for International Application No. PCT/US2013/048750, dated Nov. 22, 2013, 4 pages.

International Preliminary Report on Patentability for International Application No. PCT/US2013/048750, dated Dec. 31, 2014, 5 pages.

Supplementary European Search Report, for European Application No. 13810528.3, dated Mar. 3, 2016, 8 pages.

International Search Report and Written Opinion for International Application No. PCT/US2016/052335, dated Dec. 12, 2016, 11 pages.

Breslauer, Kenneth J., et al. "Predicting DNA duplex stability from the base sequence." Proceedings of the National Academy of Sciences USA (1986); 83.11: 3746-3750.

Rychlik, Wojciech, and Rhoads, Robert E. "A computer program for choosing optimal oligonucleotides for filter hybridization, sequencing and in vitro amplification of DNA," Nucleic Acids Research (1989); 17.21: 8543-8551.

Search Report (English translation) in Russian Application No. 2015102527, dated Jun. 19, 2017, 2 pages.

International Preliminary Report on Patentability for International Application No. PCT/US2016/052335, dated Mar. 20, 2018, 8 pages.

Extended European Search Report for European Application No. 16847496.3, dated Feb. 11, 2019, 10 pages.

U.S. Appl. No. 15/760,360, filed Mar. 15, 2018, US 2018-0264476 A1, Sep. 20, 2018, Pending.

Canadian Office Action dated Apr. 22, 2020, for Canadian Application No. 2,908,930, 4 pages.

EPO Communication dated Nov. 12, 2020 in European Application No. EP 17738851.9 concerning Systems, Apparatus, and Methods for Inline Sample Preparation, 8 pages.

Extended European Search Report for European Application No. 17738851.9, dated Sep. 4, 2019, 7 pages.

Mexican Office Action dated Mar. 2, 2020 for Mexican Application No. 350,425, 4 pages.

International Preliminary Report on Patentability and Written Opinion for International Application No. PCT/US2017/013000, dated Jul. 17, 2018, 7 pages.

International Search Report and Written Opinion for International Application No. PCT/US2017/013000, dated May 10, 2017, 10 pages.

Invitation to pay fees for International Application PCT/US2017/013000, dated Mar. 8, 2017, 3 pages.

* cited by examiner

CHEMICAL INDICATOR DEVICE WITH HEAT BLOCKS

CROSS-REFERENCE TO RELATED APPLICATIONS

This application claims the benefit of U.S. Provisional Application No. 61/665,584 filed Jun. 28, 2012 in the United States Patent and Trademark Office which is hereby incorporated by reference herein in its entirety, including but not limited to those portions that specifically appear hereinafter, the incorporation by reference being made with the following exception: In the event that any portion of the above-referenced applications are inconsistent with this application, this application supersedes said above-referenced application.

STATEMENT REGARDING FEDERALLY SPONSORED RESEARCH OR DEVELOPMENT

Not Applicable.

BACKGROUND

1. The Field of the Present Disclosure

This disclosure relates generally to a side view chemical indicator device. More particularly, but not necessarily entirely, this disclosure relates to a device for providing a simple, portable, low cost device for detecting the presence of a chemical indicator in reaction vessel.

2. Description of Related Art

Scientific processes have long been assisted by readouts that result from illumination of the chemical compound in question by electromagnetic radiation of various wavelengths. For example, in the field of DNA amplification various fluorescent dyes and fluorescent probes are utilized to determine whether the DNA sequence of interest was amplified. Depending on the type of fluorescent dye or fluorescent probe used, the fluorescence is revealed by exposing the fluorescent dye or fluorescent probe in question to appropriate electromagnetic radiation and viewing the resulting fluorescence through a colored filter.

This is the standard technology used in analyzing the products of PCR amplification. PCR amplification is generally performed in miniature test tubes. Because PCR may take hours to perform, it is generally most efficient and hence, preferable, to carry out numerous PCR reactions simultaneously, in a batch. In order to accomplish this, multiple reactions are carried out simultaneously in a collection of test tubes. Because of the space requirements for PCR devices, the batches of test tubes are most commonly arranged in a square or circular configuration.

The square or circular configuration of test tubes used in traditional PCR thermocycling requires any visual fluorescence detection be performed by viewing the test tubes from above with the light source generally located below the test tubes or vice verse. This is a less than ideal arrangement for detecting fluorescence because the light coming from below because the light is shining is the viewer's eyes. This tends to wash out much of the fluorescence, making differences in fluorescence difficult to detect. Visual detection is better performed when the test tubes are viewed from a more or less perpendicular angle to the direction of the light illuminating the test tubes. However, the arrangement of the test tubes in the traditional square or rectangular configuration renders viewing from the side difficult, if not impossible, due to the fact that the test tubes closest to the viewer tend to block the more distal test tubes from the viewer's vision.

With newer faster methods to amplify DNA it is not necessary to perform amplification in large batches. Smaller batches of DNA can be amplified cost effectively with newer amplification methods. This allows for the test tubes to be arranged in a row or in a few staggered rows. In turn, this allows for the ability to view the test tubes from the side, or from an angle that is more or less perpendicular to the direction of the illumination.

Thus, the following specification discloses a human eye readable chemical and biochemical detector for qualitative and quantitative detection.

This detector provides quantitative, and qualitative detection of fluorescent, phosphorescent, luminescent, electrochemical, or colorimetric results. The device is also adaptable to multiple color reactions, which include duplex, triplex, and higher order multiplex reactions. In one example for fluorescence readouts the device would be configured to use reporter dye matched excitation source(s) and emission matched result(s) filtering. reactions using reporter dye matched excitation sources and emission matched results filtering.

The detector is designed to be adaptable to whichever format of chemical or biochemical readout is required for the existing test. The flexibility of the system rests in two design features of the device: 1) user based chemistry and biochemistry detection choices are numerous as the device can be readily adapted any desired illumination source and coupled with any desired filtering method. The combination of illumination choices and indicator filtering enables multiple possible combinations of fluorescent, phosphorescent, luminescent, or colorimeter indicators to be configurable within the detector.

This device enables a wide range of possible wavelengths of light to be used in combination with fluorophores and detection filtering either on the device, on the viewer (glasses) or both.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
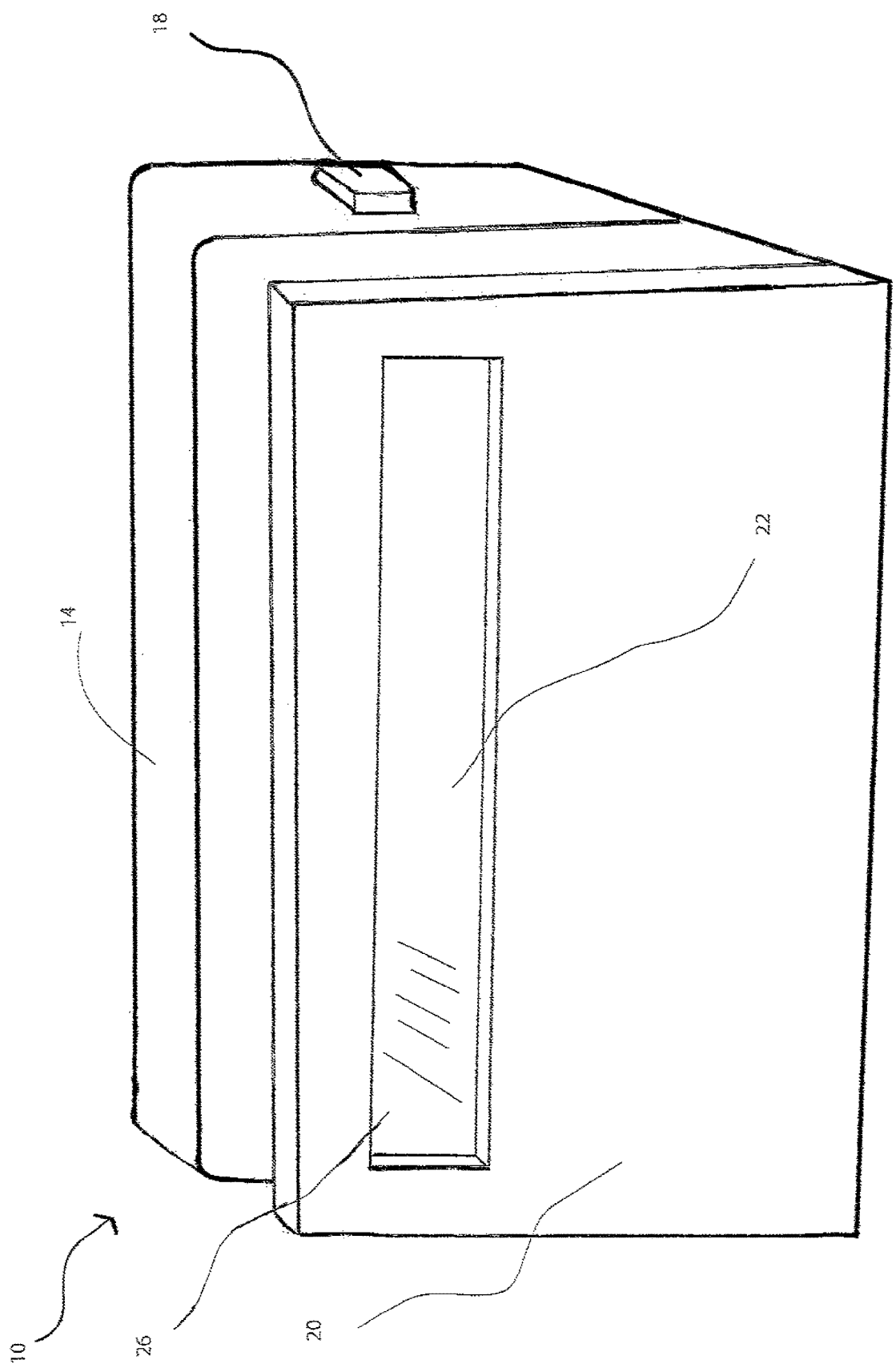
FIG. 1 is a perspective view of the device.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present invention is disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

Any publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supersedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, un-recited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "proximal" shall refer broadly to the concept of a nearest portion.

As used herein, the term "distal" shall generally refer to the opposite of proximal, and thus to the concept of a further portion, or a furthest portion, depending upon the context.

As used herein, the phrase "in an at least partially proximal-to-distal direction" shall refer generally to a two-dimensional concept of direction in which the "proximal-to-distal" direction defines one direction or dimension. An item that extends in a non-parallel direction with respect to the "proximal-to-distal" direction, that is, at a non-straight angle thereto, thereby involves two components of direction, one of which is in the "proximal-to-distal" direction and the other being in a direction orthogonal to the "proximal-to-distal" direction.

FIG. 1 depicts a portable, hand held, battery operated, device 10 for observation of the visual signal of a chemical indicator. As depicted in FIG. 1, the device comprises a body 14. In one embodiment, the body 14 is sized and shaped to be readily held in the individual user's hand. The body 14 comprises an on/off switch 18 that activates the illumination feature (not shown) of the device 10. The device 10 further comprises a shield 20. The shield 20 removably attaches to the body 14. The removable shield 20 comprises an aperture 22. This aperture 22 is sized and shaped to receive a window 26. This window 26 may be comprised of glass, plastic, mica, any polymer, or other composite material known to those of ordinary skill in the art. The window 26 may be either clear or opaque. The window may be colored. In the embodiment depicted, the window 26 is permanently affixed to the shield 20. The shield 20 is removable from the body 14. In this embodiment, multiple shields 20 may be used, with each shield 20 possessing a window 26 of a different color. This embodiment permits the user to substitute windows 26 with different colors by attaching different shields 20 to the body 14. Although the power source in the embodiment depicted in FIG. 1 is a battery, the power source could be alternating current from a conventional wall socket, a solar panel or any other power source known to those of ordinary skill in the art.

In yet another embodiment, the shield 20 is permanently affixed to the body 10. In this embodiment, the window 26 is removably attached to the shield 20. This permits the user to use windows 26 of different colors by removing the window 26 currently in place and substituting a window 26 of the desired color.

Figure 2:
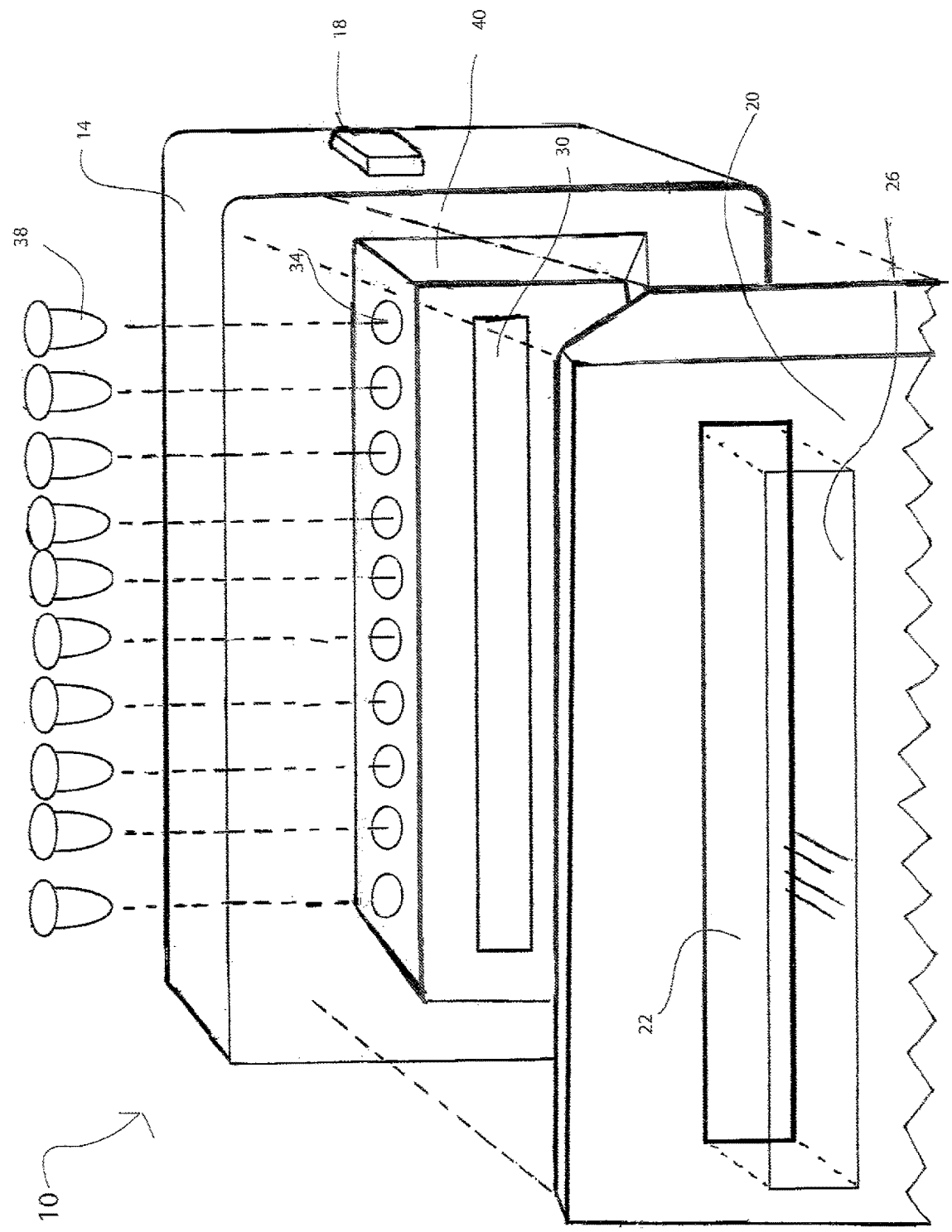
FIG. 2 is an exploded view of the device.

FIG. 2 depicts an exploded view of the device 10. The body 14 comprises at least one test tube housing 40. The at least one test tube housing 40 is more or less hollow and comprises wells 34 sized and shaped to receive test tubes 38. The test tubes 38, comprise lips at their open ends that are larger in diameter than the diameter of the wells 34. When the test tubes 38 are inserted into the wells 34, the lips prevent the test tubes 38 from transiting all the way through the well 34. Thus, the test tube housing 40 and wells 34 provide a structure to suspend and maintain the test tubes in the proper position to be illuminated and viewed by the observer.

The test tube housing 40 comprises an opening 30 that permits a view into the interior of the test tube housing 40. The opening 30 is located so as to align with the aperture 22 in the shield 20 such the user is afforded a clear view into the interior of the test tubes housing 40. The aperture 22 as well as the opening 30 are situated such that at least a portion of the test tubes 38 are visible to the viewer so that the viewer, when looking through the window views the test tubes 38 from a more or less side view or more or less perpendicularly with respect to the long axis of the test tubes 38.

In another embodiment at least one test tube 38 may be suspended and held into position by clips, brackets or any other means known to those of ordinary skill in the art. Such an embodiment would not require the test tube housing 40 and opening 30 and would allow the test tubes 38 to be viewed directly through the aperture.

Figure 3:
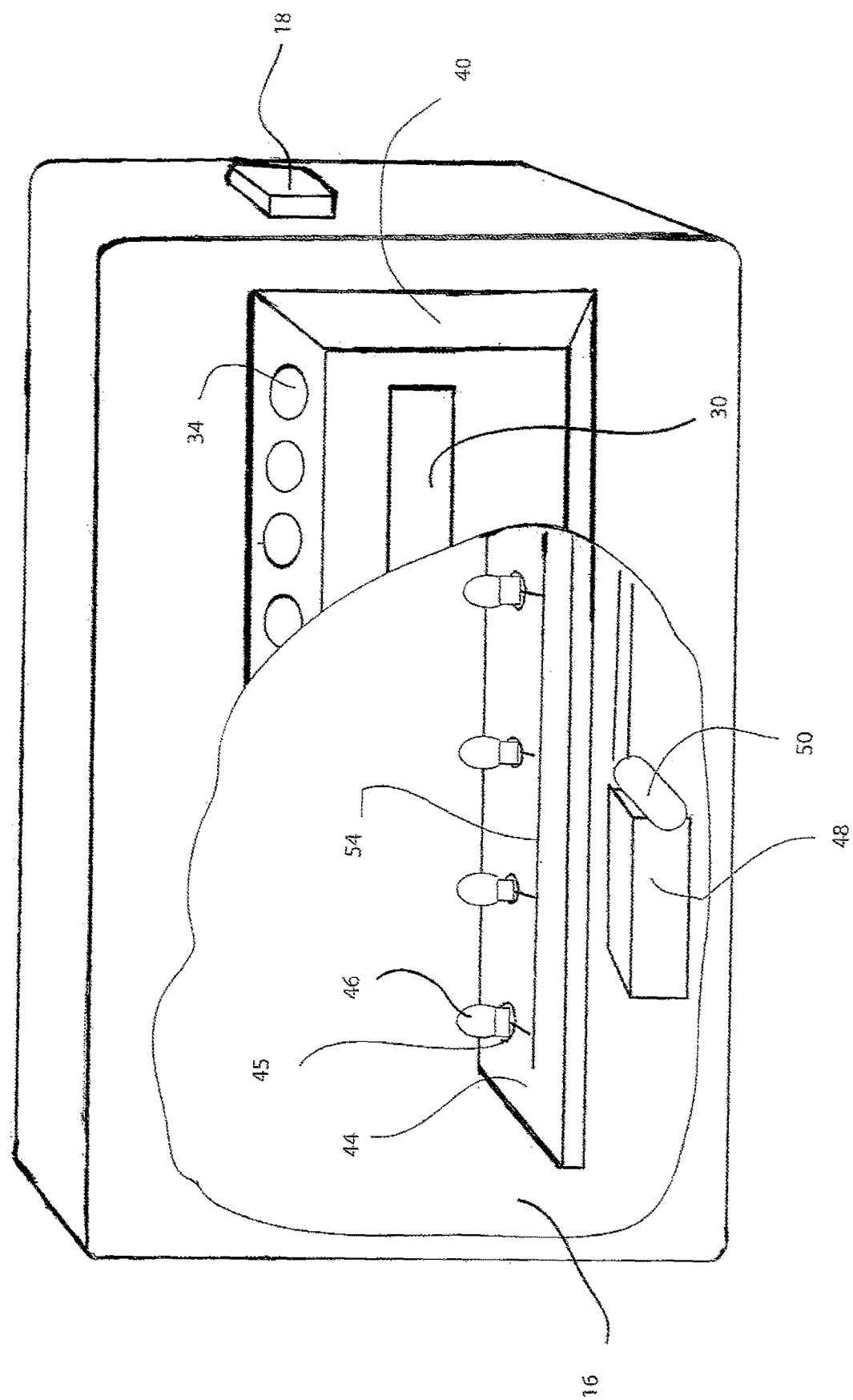
FIG. 3 is a cutaway view of the device.

FIG. 3 depicts a cutaway view of the body 14 that provides a view of the electronic architecture of the device 10. According to this embodiment, the body comprises a circuit board 44 in electrical communication with the switch 18. The electronic architecture further comprises a power source 48 in electrical communication 50 with the switch 18 such that when the switch 18 is engaged, power flows from the power source 48 to the circuit board 44. The circuit board 44 comprises sockets 45 into which at least one illuminating device 46 may be inserted. The illuminating device 46 may be a light bulb, a light emitting diode, or any other illuminating device familiar to those of ordinary skill in the art. When the circuit board 44 is powered, the at least one illuminating device 46 illuminates the test tubes 38. In the embodiment depicted in FIG. 3, the circuit board 44 and the at least one illuminating device 46 are located below the wells 34 such that when the test tubes 38 are suspended into the interior of the test tube housing 40, the at least one illuminating device illuminates the test tube from below the test tube. This results in the viewer viewing the test tubes through the aperture and the opening at a more or less right angle to the direction of the light emitted from the at least one illuminating device 46. The color of the emitted light may be altered by changing the type of the illuminating device 46. This may be accomplished by replacing the one or more individual illuminating devices 46 in the circuit board. Alternatively, it may be accomplished by unplugging and removing the existing circuit board and replacing it with a circuit board possessing one or more illuminating devices 46 of the desired color. In the alternative, the circuit board could comprise illuminating devices 46 of different colors that are selectable by the user. This may be accomplished, for example by connecting all illuminating devices 46 of one color to an individual circuit within the circuit board and allowing the user to power one or more circuits that activate the illuminating devices that will produce the desired and specific color chemical indication.

In an alternative embodiment, the aperture 22 as well as the opening 30 are situated such that the observer, when looking through the window views the test tubes from an angle of 80 degrees or more with respect to the angle of the light.

In an alternative embodiment, the aperture 22 as well as the opening 30 are situated such that the observer, when looking through the window views the test tubes from an angle of 70 degrees or more respect to the angle of the light.

In an alternative embodiment, the aperture 22 as well as the opening 30 are situated such that the observer, when looking through the window views the test tubes from an angle of 60 degrees or more with respect to the angle of the light.

In an alternative embodiment, the aperture 22 as well as the opening 30 are situated such that the observer, when looking through the window views the test tubes from an angle of 50 degrees or more with respect to the angle of the light.

In an alternative embodiment, the aperture 22 as well as the opening 30 are situated such that the observer, when looking through the window views the test tubes from an angle of 40 degrees or more with respect to the angle of the light.

In an alternative embodiment, the aperture 22 as well as the opening 30 are situated such that the observer, when looking through the window views the test tubes from an angle of 30 degrees or more with respect to the angle of the light.

In an alternative embodiment, the aperture 22 as well as the opening 30 are situated such that the observer, when looking through the window views the test tubes from an angle of 20 degrees or more with respect to the angle of the light.

In an alternative embodiment, the aperture 22 as well as the opening 30 are situated such that the observer, when looking through the window views the test tubes from an angle of 10 degrees or more with respect to the angle of the light.

In an alternative embodiment, the aperture 22 as well as the opening 30 are situated such that the observer, when looking through the window views the test tubes from an angle of 5 degrees or more with respect to the angle of the light.

In an alternative embodiment, the aperture 22 as well as the opening 30 are situated such that the observer, when looking through the window views the test tubes from an angle of 1 degree or more with respect to the angle of the light.

Figure 4:
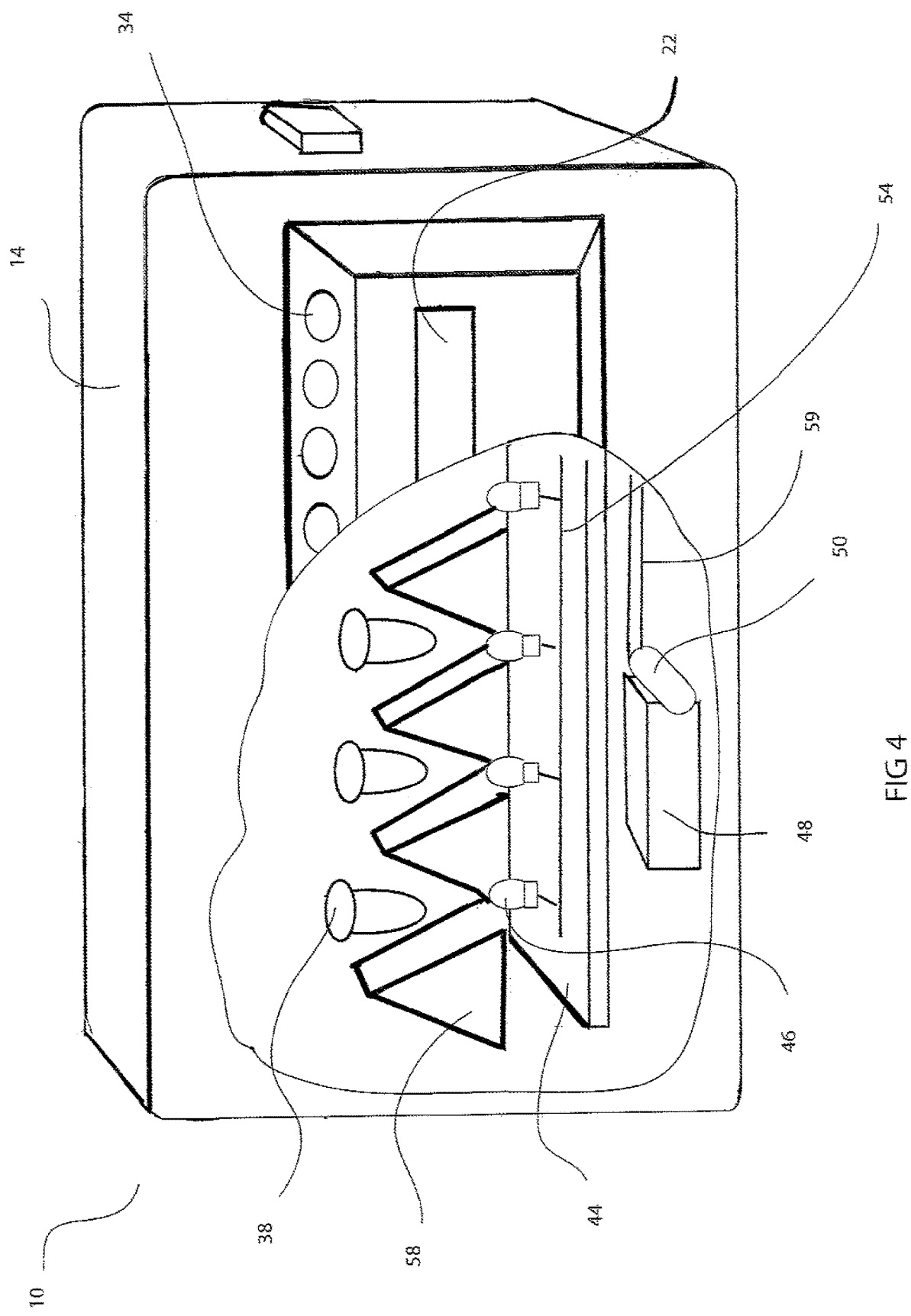
FIG. 4 is a cutaway view of another embodiment of the device containing heat blocks.

In another embodiment, depicted in FIG. 4, the device comprises a set of heat blocks 58 located proximal to the test tubes 38, so as to be in thermal communication with the test tubes 38. The heat blocks 58 are in electrical communication with the circuit board 44 such that when the circuit board 44 is powered, the heat blocks 58 are powered. The electrical connection 50 between the heat blocks 58 and the power source 48 may have at least one resistor 59 or some other device known to those of ordinary skill in the art capable of reducing the current to one or more heat blocks 58 such that the current supplied to the heat block on one side of the test tube is greater than the current supplied to the heat block 58 on the other side of the other side of the test tube. This difference in current causes a temperature differential between the heat blocks 58 sufficient to create a convection current within the test tube. In the embodiment depicted in FIG. 4, the heat blocks 58 conform more or less to the shape of the test tubes 38 so as to provide a uniform heat transfer between the heat blocks 58 and the test tubes 38.

In another embodiment, the device 10 comprises a means to adjust the temperatures of the heat blocks. For example, one or more rheostats may be included within the circuitry between the power source and the heat blocks 58 so that the temperature of one or more of the heat blocks 58 may be changed. The temperature may also be controlled by any other device or combination of devices known to those of ordinary skill in the art.

In another embodiment, the device 10 may have a heating element and/or a cooling element such that the device can be made to thermocycle within a set temperature range.

In another embodiment, the device does not possess an internal light source, but rather comprises an opening into the interior of the body. This opening may be in the back or in the bottom of the device 10. The open portion is sized and shaped to allow illumination from a light source external the device 10 to enter the device 10 and illuminate the test tubes 38.

In yet another embodiment, the device possesses a light sensitive meter that registers the wavelength of the light that is emitted from the test tube. The light sensitive meter is in electrical communication with a processor capable of executing a machine readable code that converts the registered wavelength into a digital format. This digitized data may then be stored in memory device that is in electrical communication with the processor. The digitized data may also be displayed in an output device that is in electrical communication with the processor and/or the memory device.

In another embodiment, the aperture 22 in the shield 20 does not comprise a window 26. In this embodiment, the viewer uses a light filter external to the device to make the indicator visible. For, example, the light filter may comprise glasses with lenses of an appropriate color.

In another embodiment, the light source is located to the side of the test tubes 38 and the viewing aperture is located above the test tubes 38. In another embodiment, the light source is located to the side of the test tubes 38 and the viewing aperture is located below the test tubes 38. In another embodiment, the light source is located more or less above the test tubes 38 and the viewing aperture 22 is located to the side of the test tubes 38.

Figure 5:
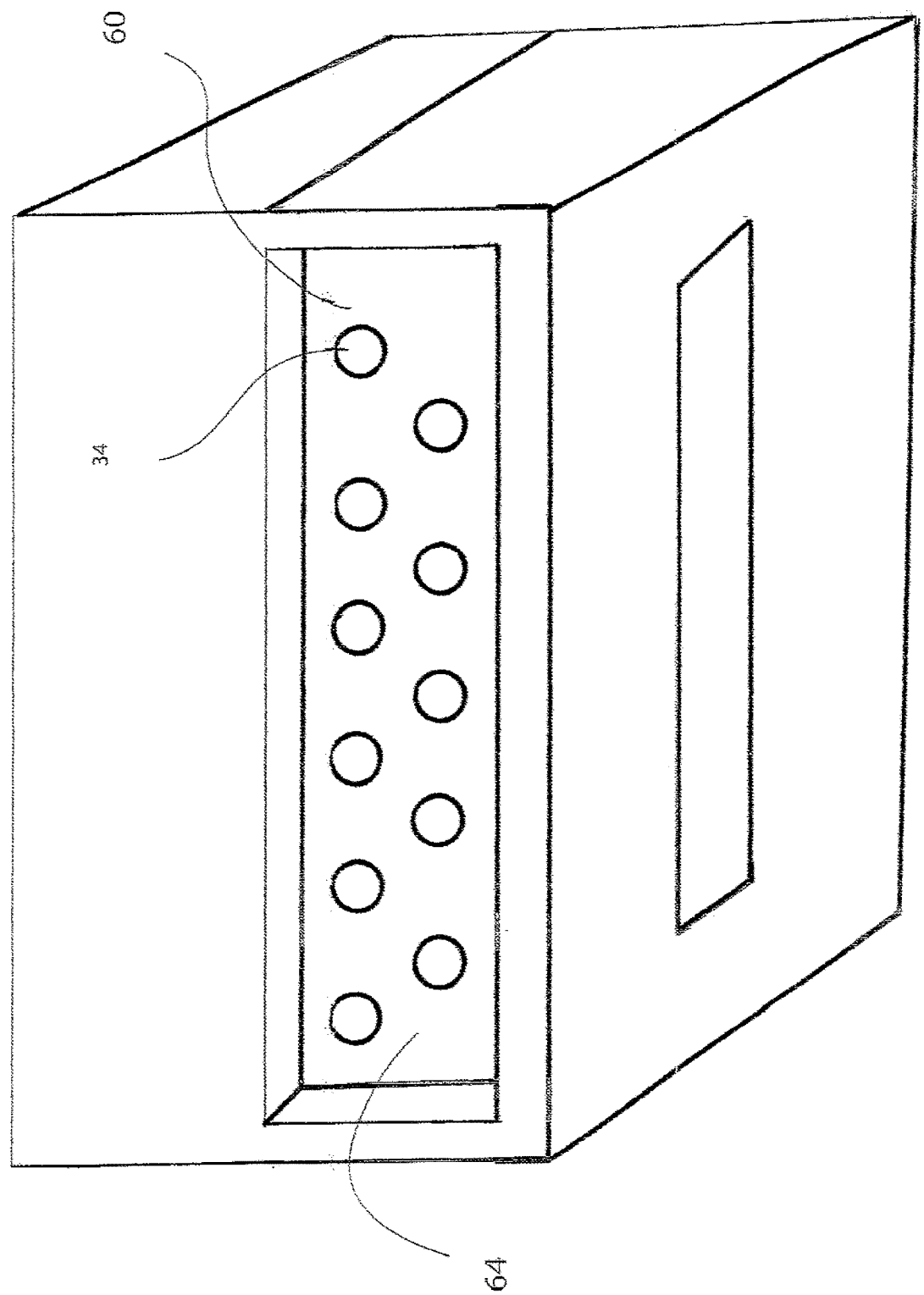
FIG. 5 is a top view of another embodiment of the device having rows of holders.

In another embodiment, depicted in FIG. 5, the test tube wells 34 are arranged in at least two rows, staggered. As depicted in FIG. 5, the test tube wells 34 are arranged in a first row 64 and a second row 60. The test tube wells 34 are arranged in a staggered formation such that the test tubes 38 in the second row 60 are not blocked by the test tubes 38 in the first row 64 from the viewer looking through the aperture.

Figure 6:
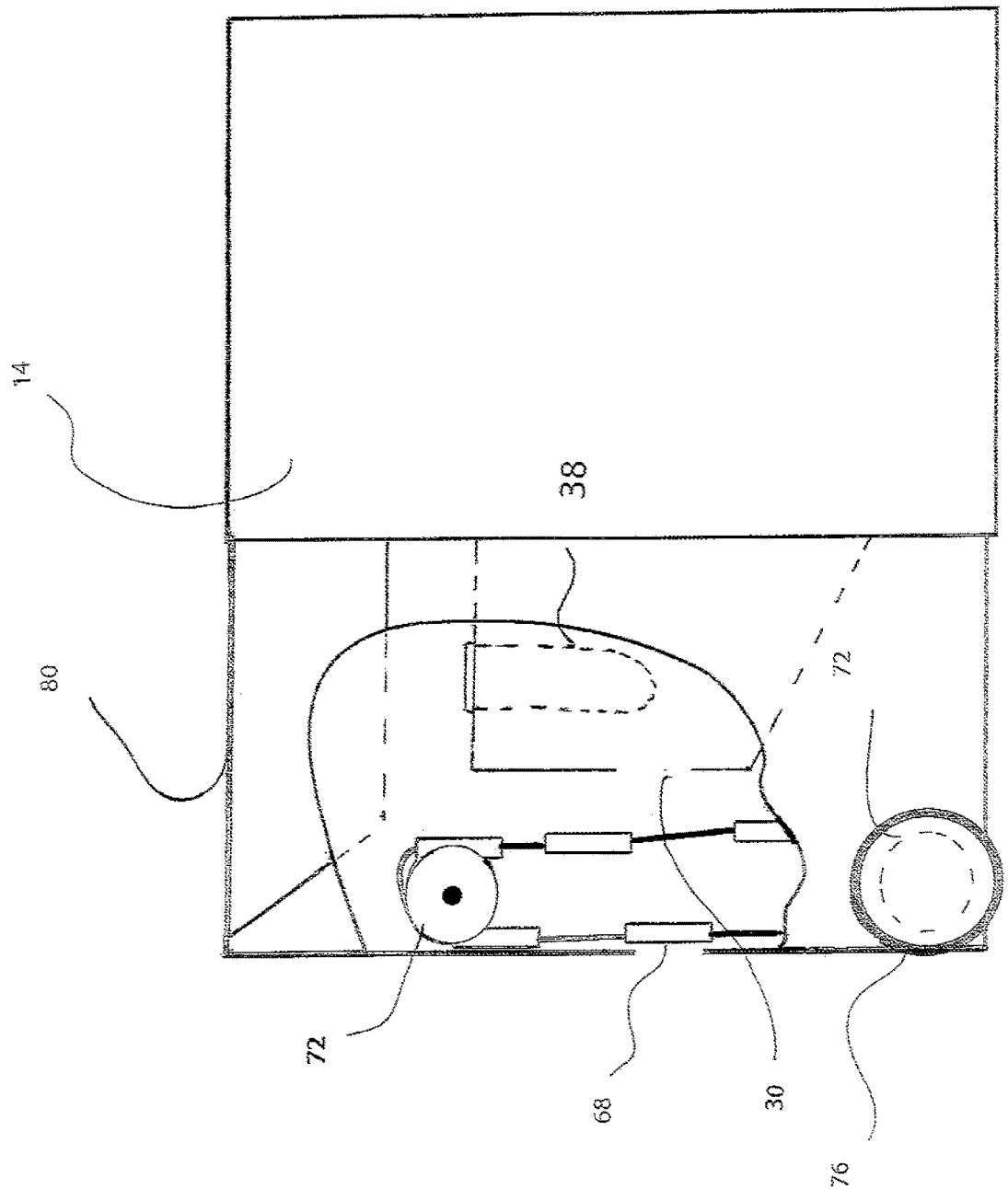
FIG. 6 is a side view of another embodiment of the device having a rotatable window.

In another embodiment, depicted in FIG. 6, windows 68 of varying colors are incorporated into a continuous belt mechanism 70 within the device 10. The belt mechanism 70 is stretched between two rotatable wheels 72. One of the rotatable wheels is affixed to a actuator wheel 76. As the actuator wheel 76 is rotated, it causes the belt mechanism to move, which in turn, causes the windows 68 of varying colors to move between at least one rotatable wheel 72. In this manner, the user may vary the colors of the windows 68 by manipulating the actuator wheel 76 until the window of the desired color appears in front of the aperture 22. As windows 68 of different colors move between the rotatable wheels, they move past the aperture 22 in succession. In addition, FIG. 6 depicts a cover 80 attached at the upper portion of the device 10. The cover 80 is configured in such a manner as to block at least a portion of the ambient light.

In another embodiment, the device 10 is too large to be readily hand held.

What is claimed is:

1. An apparatus, comprising:
   a controller;
   a plurality of heat blocks operatively coupled to the controller;
   a housing including:
   a structure to maintain at least one sample container of a plurality of sample containers in a proper position to be viewed through the aperture; and
   a plurality of wells, each well of the plurality of wells configured to receive a sample container of the plurality of sample containers such that during use, a first side of a first sample container disposed in a first well of the plurality of wells is in proximity of a first heat block of the plurality of heat blocks and a second side, opposite the first side, of the first sample container is in proximity of a second heat block of the plurality of heat blocks, and a first side of a second sample container disposed in a second well of the plurality of wells is in proximity of a second heat block of the plurality of heat blocks and a second side of the second sample container, opposite the first side of the second sample container, is in proximity of a third heat block of the plurality of heat blocks,
   the controller configured to:
   heat the first heat block to a first temperature, the second heat block to a second temperature, and the third heat block to a third temperature, the first temperature different than the second temperature and the second temperature different than the third temperature,
   cause a first temperature differential to be formed between the first heat block and the second heat block, the first temperature differential being sufficient to cause a convection current to be formed between the first side and the second side of the first sample container within a sample disposed in the first sample container, and
   cause a second temperature differential gradient to be formed between the second heat block and the third heat block, the second temperature differential being sufficient to cause a convection current to be formed between the first side and the second side of the second sample container within a sample disposed in the second sample container.

2. The apparatus of claim 1, the controller configured to heat the first heat block by applying a first current to the first heat block and to heat the second heat block by applying a second current to the second heat block, to form the first temperature differential, the first current different than the second current.

3. The apparatus of claim 1, wherein a first surface of the first heat block conforms to the first side of the first sample container, and a second surface of the second heat block conforms to the second side, opposite the first side, of the first sample container.

4. The apparatus of claim 3, wherein a bottom surface of each sample container is curved.

5. The apparatus of claim 1, the controller further configured to thermocycle the first heat block, the second heat block, and the third heat block within a predetermined temperature range.

6. The apparatus of claim 1, further comprising a plurality of resistors corresponding to the plurality of heat blocks, each resistor disposed between the controller and its corresponding heat block.

7. The apparatus of claim 1, further comprising a light source including a plurality of excitation sources operatively coupled to the controller, each excitation source corresponding to a different well of the plurality of wells, each excitation source configured to, during use, illuminate a corresponding sample container in its corresponding well.

8. The apparatus of claim 1, further comprising an aperture including a transparent window formed on a side of the apparatus, the transparent window configured to permit viewing of an interior of the apparatus.

9. The apparatus of claim 8, wherein the transparent window is removable.

10. The apparatus of claim 1, further comprising an aperture that includes a colored window formed on a side of the apparatus, the colored window configured to permit viewing of an interior of the apparatus.

11. The apparatus of claim 1, further comprising a light source that includes a plurality of excitation sources operatively coupled to the controller, each excitation source of the plurality of excitation sources being located below each well of the plurality of wells and each excitation source of the plurality of excitation sources being configured to illuminate at least a bottom portion of a sample container received in each well of the plurality of wells.

12. The apparatus of claim 1, further comprising a light source and an aperture wherein the aperture, the light source and the structure to maintain the at least one sample container is configured such that when the at least one sample container is placed in the apparatus, an observer views the at least one sample container at an angle that is perpendicular to a direction of the illumination.

13. The apparatus of claim 1, further comprising:
a plurality of windows incorporated in a continuous belt operatively coupled to an actuator, the plurality of windows including colored windows of more than one color, such that manipulating the actuator causes movement of the belt such that a first window of the plurality of windows, placed in front of the aperture, can be moved to place a second window of the plurality of windows, in front of the aperture.

14. The apparatus of claim 1, wherein the plurality of wells is organized in a first row of wells and a second row of wells, the first row of wells being staggered relative to the second of wells.

15. An apparatus, comprising:
a controller;
a plurality of heat blocks operatively coupled to the controller;
a housing including:
an aperture;
a light source;
a structure to maintain at least one sample container of a plurality of sample containers in a proper position to be viewed through the aperture; and
a plurality of wells, each well of the plurality of wells configured to receive a sample container of the plurality of sample containers such that during use, a first side of a first sample container disposed in a first well of the plurality of wells is in proximity of a first heat block of the plurality of heat blocks and a second side, opposite the first side, of the first sample container is in proximity of a second heat block of the plurality of heat blocks, and a first side of a second sample container disposed in a second well of the plurality of wells is in proximity of a second heat block of the plurality of heat blocks and a second side of the second sample container, opposite the first side of the second sample container, is in proximity of a third heat block of the plurality of heat blocks,
the controller configured to:
heat the first heat block to a first temperature, the second heat block to a second temperature, and the third heat block to a third temperature, the first temperature different than the second temperature and the second temperature different than the third temperature,
cause a first temperature differential to be formed between the first heat block and the second heat block, the first temperature differential being sufficient to cause a convection current to be formed between the first side and the second side of the first sample container within a sample disposed in the first sample container, and
cause a second temperature differential gradient to be formed between the second heat block and the third heat block, the second temperature differential being sufficient to cause a convection current to be formed between the first side and the second side of the second sample container within a sample disposed in the second sample container.

16. A method of operating a device, the method comprising:
positioning a first sample container in a first well of a plurality of wells such that a first side of a first sample container is in proximity of a first heat block of a plurality of heat blocks included in the device, and a second side of the first sample container, opposite the first side, is in proximity of a second heat block of the plurality of heat blocks;
positioning a second sample container in a second well of the plurality of wells such that a first side of the second sample container disposed in the second well of the plurality of wells is in proximity of the second heat block of the plurality of heat blocks and a second side of the second sample container, opposite the first side of the second sample container, is in proximity of a third heat block of the plurality of heat blocks;
heating the first heat block to a first temperature, heating the second heat block to a second temperature, and heating the third heat block to a third temperature, the first temperature different than the second temperature and the second temperature different than the third temperature;
causing a first temperature differential to be formed between the first heat block and the second heat block, the first temperature differential being sufficient to cause a first convection current to be formed between the first side and the second side of the first sample container within a sample disposed in the first sample container, and
causing a second temperature differential to be formed between the second heat block and the third heat block, the second temperature differential being sufficient to cause a second convection current to be formed between the first side and the second side of the second sample container within a sample disposed in the second sample container.

17. The method of claim 16, wherein the heating the first heat block to a first temperature is by applying a first current to the first heat block and the heating the second heat block to a second temperature is by applying a second current to the second heat block.

18. The method of claim 16, further comprising:
thermocycling the first heat block, the second heat block, and the third heat block within a predetermined temperature range.

19. The method of claim 16, wherein:
a first surface of the first heat block conforms to the first side of the first sample container, a second surface of the second heat block conforms to the second side, opposite the first side, of the first sample container, and a bottom surface of the first sample container is curved.

* * * * *